United States Patent
Agarwal et al.

(10) Patent No.: US 11,860,670 B2
(45) Date of Patent: Jan. 2, 2024

(54) ACCESSING A MEMORY USING INDEX OFFSET INFORMATION

(71) Applicant: Intel Corporation, Santa Clara, CA (US)

(72) Inventors: Monam Agarwal, Hillsboro, OR (US); Anand K. Enamandram, Folsom, CA (US); Wei Chen, Portland, OR (US); Kerry Vander Kamp, Hillsboro, OR (US); Robert A. Branch, Portland, OR (US); Yen-Cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 17/553,458

(22) Filed: Dec. 16, 2021

(65) Prior Publication Data

US 2023/0195616 A1 Jun. 22, 2023

(51) Int. Cl.
*G06F 12/02* (2006.01)
*G06F 13/16* (2006.01)

(52) U.S. Cl.
CPC ...... *G06F 12/0292* (2013.01); *G06F 12/0238* (2013.01); *G06F 13/161* (2013.01); *G06F 13/1642* (2013.01); *G06F 13/1668* (2013.01); *G06F 2212/1021* (2013.01)

(58) Field of Classification Search
None
See application file for complete search history.

(56) References Cited

U.S. PATENT DOCUMENTS

| | | | |
|---|---|---|---|
| 5,751,996 A | 5/1998 | Glew et al. | |
| 9,026,767 B2 | 5/2015 | Schaefer et al. | |
| 9,317,429 B2 | 4/2016 | Ramanujan et al. | |
| 9,734,079 B2 | 8/2017 | Feekes et al. | |
| 9,921,972 B2 | 3/2018 | Wilkerson et al. | |
| 11,030,120 B2 | 6/2021 | Zmudzinski et al. | |

(Continued)

FOREIGN PATENT DOCUMENTS

EP 2472412 7/2012

OTHER PUBLICATIONS

Extended European Search Report from European Patent Application No. 22207686.1 dated May 23, 2023, 7 pgs.

*Primary Examiner* — Charles J Choi
(74) *Attorney, Agent, or Firm* — Essential Patents Group, LLP

(57) ABSTRACT

Techniques and mechanisms for identifying a memory access resource which is to be a target of an access request. In an embodiment, a processor comprises route tables which are to provide entries corresponding to different respective memory access resources which are coupled to the processor. The processor further comprises a list of items which each correspond to a different respective range of addresses, wherein the items each include an identifier of a respective route table, and an identifier of a respective index offset. Based on an address of the access request, a decoder circuit of the processor searches the list to identify a corresponding one of the items. In another embodiment, the decoder circuit accesses a route table entry, based on the search, to determine how the access request is to be directed to a particular memory access resource.

20 Claims, 14 Drawing Sheets

(56) References Cited

U.S. PATENT DOCUMENTS

| | | | |
|---|---|---|---|
| 2012/0117355 A1* | 5/2012 | Campbell | G06F 12/1009 711/206 |
| 2019/0228169 A1* | 7/2019 | Huang | G06F 12/1441 |
| 2022/0108012 A1* | 4/2022 | Favor | G06F 12/0895 |

* cited by examiner

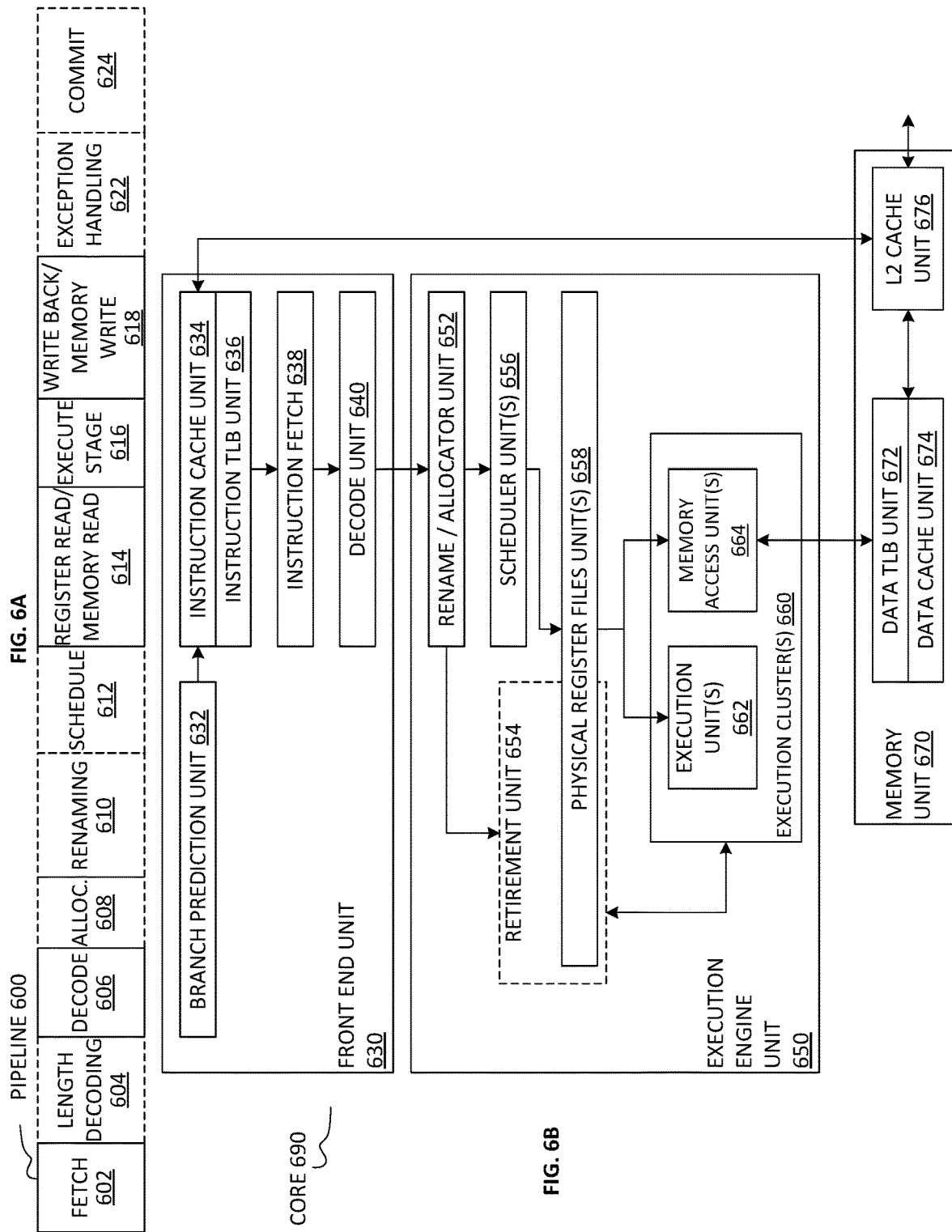

ACCESSING A MEMORY USING INDEX OFFSET INFORMATION

BACKGROUND

1. Technical Field

This disclosure generally relates to memory management and more particularly, but not exclusively, to the routing of a request to a targeted memory access resource.

2. Background Art

Successive generations of integrated circuit (IC) technologies face greater consumer requirements, as they continue to trend toward increased capabilities and variety. One such technology is that of server system-on-chip (SOC) architectures, which have demonstrated a strong generation-to-generation trend of increasing per-socket core counts. These increased core counts have, in turn, driven a greater demand for larger bandwidths for cores to access memory devices.

Furthermore, SOCs and other IC architectures are expected to integrate and/or otherwise efficiently operate with an increasing variety of memory device types such as high bandwidth memory (HBM), compute express link (CXL) memory, two-level memory (2LM), and/or the like. Further still, IC architectures are increasingly expected to support flexibility in providing various configurations, such as different types of interleave modes (such as power-of-two-way interleaving, 3/6-way interleaving, heterogeneous DDR5/CXL interleaving, and/or the like) and interleave granularities (256B, 1K, 4K, etc.).

As a result, there is expected to be an increasing premium placed on improvements to how memory resources are made accessible to processor cores.

BRIEF DESCRIPTION OF THE DRAWINGS

The various embodiments of the present invention are illustrated by way of example, and not by way of limitation, in the figures of the accompanying drawings and in which:

FIG. 6A is a block diagram illustrating both an exemplary in-order pipeline and an exemplary register renaming, out-of-order issue/execution pipeline according to an embodiment.

FIG. 6B is a block diagram illustrating both an exemplary embodiment of an in-order architecture core and an exemplary register renaming, out-of-order issue/execution architecture core to be included in a processor according to an embodiment.

DETAILED DESCRIPTION

Figure 1:
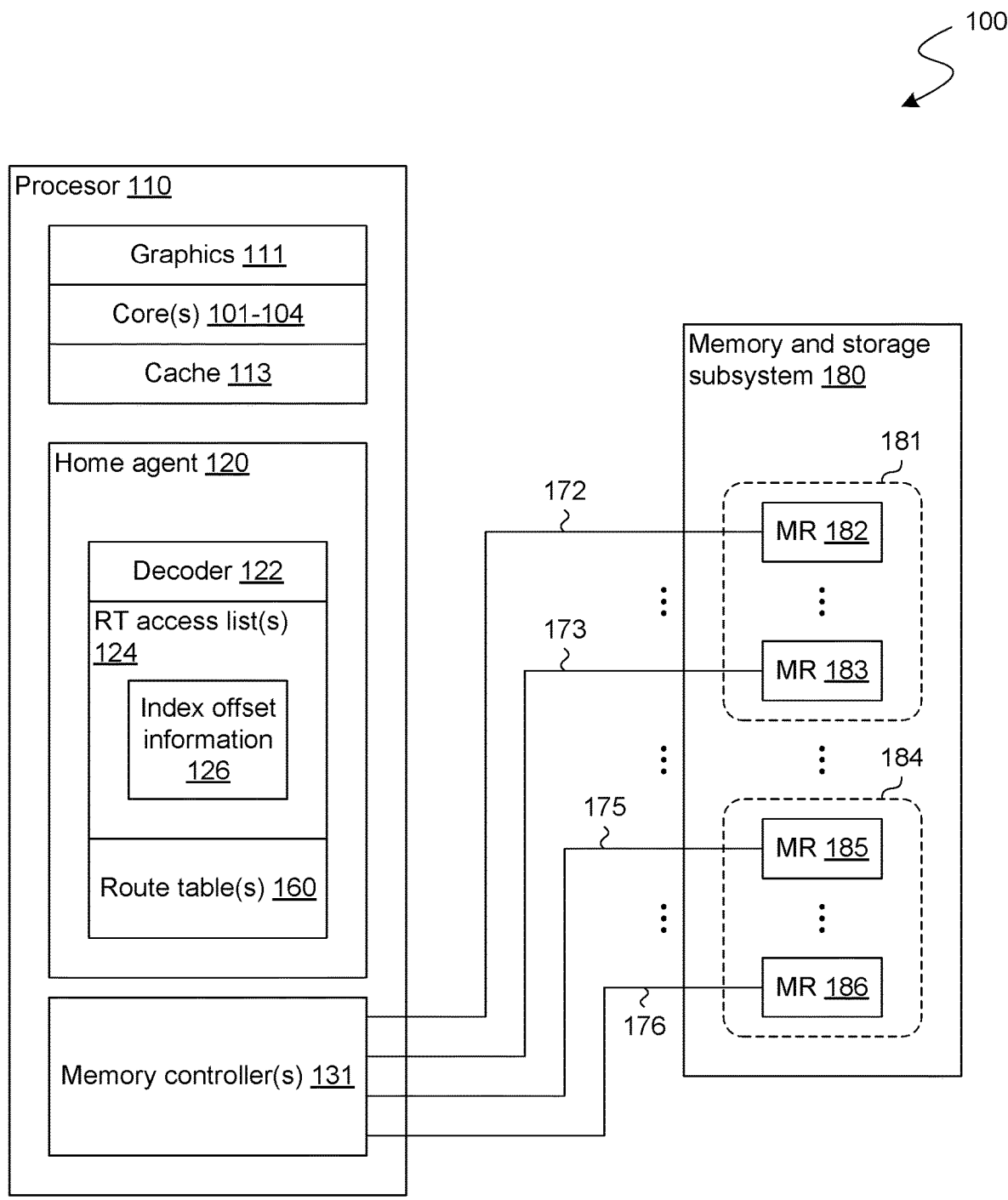
FIG. 1 shows a functional block diagram illustrating features of a system to provide routing information according to an embodiment.

Embodiments discussed herein variously provide techniques and mechanisms for identifying a memory access resource to be accessed. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor which is operable to access any of multiple memory access resources.

FIG. 1 shows features of a system 100 to provide routing information according to an embodiment. System 100 illustrates one example of an embodiment wherein circuitry facilitates a routing of a memory access request to a particular one of multiple memory access resources. The routing is based on information (referred to herein as "index offset information") which identifies a difference between a location in the route table, and some reference location.

As shown in FIG. 1, system 100 comprises a processor 110 and memory/storage subsystem 180 which is coupled to processor 110. System 100 comprises one or more processors, although a single processor 110 is illustrated in FIG. 1 for simplicity. Processor 110 is any type of data processor comprising a general purpose or special purpose central processing unit (CPU), an application-specific integrated circuit (ASIC) or a digital signal processor (DSP). For example, processor 110 is a general-purpose processor, such as a Core™ i3, i5, i7, 2 Duo and Quad, or Xeon™ processor, all of which are available from Intel Corporation, of Santa Clara, Calif. Alternatively, processor 110 is from another company, such as ARM Holdings, Ltd, of Sunnyvale, Calif., MIPS Technologies of Sunnyvale, Calif., etc. Processor 110 is a special-purpose processor, such as, for example, a network or communication processor, compression engine, graphics processor, co-processor, embedded processor, or the like. Processor 110 is implemented on one or more chips comprised within one or more packages. Processor 110 is a part of and/or is implemented on one or more substrates using any of a number of process technologies, such as, for example, complementary metal-oxide-semiconductor (CMOS), bipolar CMOS (BiCMOS), or n-type metal-oxidesemiconductor (NMOS). In some embodiments, system 100 has a system-on-a-chip (SOC) configuration comprising processor 110.

The processor 110 also comprises one or more cores 101-104, although a single core is illustrated in FIG. 1, again, for the sake of clarity. In many embodiments, the core(s) 101-104 comprises internal functional blocks such as one or more execution units, retirement units, a set of general purpose and specific registers, etc. If the core(s) are multi-threaded or hyper-threaded, then each hardware thread is considered as a "logical" core as well. The cores 101-104 are homogenous or heterogeneous in terms of architecture and/or instruction set. For example, some of the cores are in-order while others are out-of-order. As another example, two or more of the cores are capable of executing the same instruction set, while others are capable of executing only a subset of that instruction set or a different instruction set.

In the example embodiment shown, the processor 110 comprises an integrated graphics unit 111 which comprises logic for executing graphics commands such as 3D or 2D graphics commands. While some embodiments are not limited to any particular integrated graphics unit 111, in one embodiment, the graphics unit 111 is capable of executing industry standard graphics commands such as those specified by the Open GL and/or Direct X application programming interfaces (APIs) (e.g., OpenGL 4.1 and Direct X 11). In other embodiments, processor 110 omits graphics unit 111.

The processor 110 also comprises one or more caches— e.g., including the illustrative cache 113 shown—which are implemented (for example) with a static random-access memory (SRAM) and/or a dynamic random-access memory (DRAM). In many embodiments that are not shown, additional caches other than cache 113 are implemented so that multiple levels of cache exist between the execution units in the core(s) 101-104 and a memory and storage subsystem 180 of system 100, which is coupled to processor 110. For example, the set of shared cache units comprises an upper-level cache, such as a level 1 (L1) cache, mid-level caches, such as level 2 (L2), level 3 (L3), level 4 (L4), a last level cache (LLC), or other levels of cache, and/or different combinations thereof. In different embodiments, cache 113 is apportioned in different ways and is one of many different sizes in different embodiments. For example, cache 113 is an 8 megabyte (MB) cache, a 16 MB cache, etc. Additionally, in different embodiments the cache is a direct mapped cache, a fully associative cache, a multi-way set-associative cache, or a cache with another type of mapping. In other embodiments that comprise multiple cores, cache 113 comprises one large portion shared among all cores or is divided into several separately functional slices (e.g., one slice for each core). Cache 113 also comprises one portion shared among all cores and several other portions that are separate functional slices per core.

The processor 110 also comprises a home agent 120 which comprises circuitry to coordinate operation with core(s) 101-104. In an embodiment home agent 120 includes (or alternatively, is coupled to operate with) circuitry that is configured to facilitate the determining of how a given memory access request is to be routed to a particular one of various available resources (which are referred to herein as "memory access resources"). By way of illustration and not limitation, such circuitry comprises a decoder 122, one or more route tables 160, and one or more route table (RT) access lists 124 which facilitate an accessing of route table(s) 160. Based on such accessing of route table(s) 160, a memory controller of system 100—e.g., such as one of the illustrative one or more memory controllers 131 of processor 110—provides a memory access request a particular memory access resource of memory and storage subsystem 180.

Certain features of various embodiments are described herein with reference to the identification of a memory access resource, wherein the identification comprises using a route table, as well as information which identifies an offset between two indices that each correspond to a respective location in said route table.

As used herein, "memory access resource" (or for brevity, "access resource") refers to a resource by which access to one or more memory locations is to be provided to a processor core. For example, in some embodiments, a memory access resource comprises a memory device which is coupled to a given one or more processor cores via a memory controller. Additionally or alternatively, a memory access resource comprises a memory controller (e.g., on its own, or in combination with the memory device which is to be accessed via that memory controller). In some embodiments, a memory access resource comprises a combination of multiple memory devices which, for example, are to be spanned by a given data interleaving scheme.

As used herein, "memory access type" (or "access type," for brevity) refers to a type of access which a given memory access resource is to provide or otherwise support. For example, in some embodiments, a memory access type is, or otherwise comprises, a type of memory device to be accessed—e.g., wherein the memory device type is one of a DDR type (e.g., DDR4 type and/or a DDR5 type), a CXL memory type, a HBM type, a 2LM type, a heterogeneous combination of memory types, or the like. Additionally or alternatively, a memory access type is, or otherwise comprises, a mode of interleaving according to which a memory access is to be performed—e.g., wherein the mode determines a number of ways and/or types of memory devices which are to be spanned by such interleaving. Additionally or alternatively, a memory access type is, or otherwise comprises, a type of interleaving granularity according to which a memory location is to be accessed. In some embodiments, a memory access type comprises multiple constituent "sub-types"—e.g., wherein the memory access type comprises a combination of a device type, an interleaving mode, and an interleaving granularity. One or more memory access resources which are used to each support at least some common memory access type are referred to herein as a "set of memory access resources," a "memory access resource set," or (for brevity) an "access resource set."

In the particular context of provisioning memory access to a processor, "route table" refers herein to circuitry of the processor, wherein the circuitry is configured to function as a repository of reference information which identifies some one or more memory access resources. In some embodiments, the route table further identifies, for each such memory access resource, a respective memory access type which is provided with that resource. For example, a given route table is to be programmed—e.g., by a basic input/output system (BIOS) or other suitable logic—with one or more entries each corresponding to a different respective memory access resource. The entries are available to be searched or otherwise evaluated—e.g., based on a physical address provided in a memory access request (or, for example, a corresponding logical block address)—to determine which of various memory access resources is to be the target of a memory access. In an illustrative scenario according to one embodiment, a route table comprises a set of one or more entries (e.g., including multiple entries which are contiguous with each other in the route table) which each represent a respective memory access resource that each support at least one common memory access type.

In some embodiments, route tables of a processor are distinct from each other in hardware, and are not (for example) data storage regions which are merely distinguished logically from each other with software. By way of illustration and not limitation, such route tables are accessed via different respective buses, ports, control signals and/or other hardware mechanisms—e.g., wherein each such route table is limited in hardware to provide only a respective maximum number of possible entries.

As used herein, "route table access list" (or "access list," for brevity) refers to circuitry of a processor which is to function as a repository of other reference information which facilitates the accessing of a route table (and, for example, a particular entry block of said route table). In some embodiments, a route table access list is provided with any of various registers and/or other suitable circuitry to store items that each correspond to a different respective range of addresses (or "address range"). For example, a given item of such an access list (referred to herein as an "access list item," or simply "list item") comprises, is indexed based on, or otherwise corresponds to an identifier of a respective address range. Such an access list item facilitates the identification of one or more memory access resources which each correspond to (e.g., which have each been assigned) that address range. For example, in one such embodiment, the access list item comprises an identifier of a route table, wherein an entry of that route table identifies and/or otherwise describes the corresponding memory access resource. In some embodiments, the access list item further comprises an identifier of an index offset, which is to facilitate the accessing of an entry block which includes said entry. In one such embodiment, the access list item further comprises an identifier of a size of such an entry block.

In this particular context, "index offset" refers to a difference between two indices which correspond to different respective locations in a given route table. For example, entries of a route table each correspond to—and are each addressable with—a different respective index, wherein some baseline index is used as a reference to which an index offset is to be applied in the identification of a particular route table entry (or entry block).

In traditional memory management, entries of a given route table are programmed using a base index (e.g., 0), which—along with the given route table—is assigned to one particular memory access type. Thus, a given route table is conventionally dedicated to only memory access resources which are at least of that one memory access type—e.g., wherein a memory access resource which did not belong to that memory access type is to be accessed using a different route table. For example, one route table would be used to facilitate access to only DDR4/5 memory. This approach is prone to wasting route table capacity—e.g., where the number of memory access resources which are of a particular memory access type is significantly less than the number of entries which a route table can provide. Mitigating such wasted capacity has depended, to date, on developers of system firmware (such as the BIOS), and has led to such firmware being more complex, slow, and error prone in programming route tables. In providing index offset information—such as the index offset information 126 of RT access list(s) 124—as a basis for accessing entries of a given route table, some embodiments variously facilitate a decoupling of a given route table from any particular memory access type. For example, in some embodiments, a route table is able to provide entries representing different respective memory access types which (for example) do not have any common memory access sub-type.

In the example embodiment of system 100, memory and storage subsystem 180 comprises any of various memory access resources (e.g., memory devices) which each include, or otherwise facilitate an access to, respective memory locations by various ones of cores 101-104. By way of illustration and not limitation, memory and storage subsystem 180 comprises memory access resources MR 182, . . . , MR 183, and memory access resources MR 185, . . . , MR 186. However, memory and storage subsystem 180 comprises more, fewer and/or different memory access resources, in other embodiments.

In some embodiments, various memory access resources of memory and storage subsystem 180 support different respective memory access types—e.g., wherein a first one or more such memory access resources each support a first memory access type, and a second one or more such memory access resources each support a second memory access type which, for example, does not include the first memory access type (and, in one such embodiment, does not include any constituent access sub-type of said first memory access type). By way of illustration and not limitation, memory and storage subsystem 180 comprises both a set 181 of memory access resources MR 182, . . . , MR 183 which each support a first access type, and another set 184 of memory access resources MR 185, . . . , MR 186 which each support a second access type. However, memory and storage subsystem 180 comprises more and/or different sets of one or more memory access resources, in other embodiments.

In one such embodiment, the first access type comprises one or more of a first memory device type, a first interleave mode, and/or first interleave granularity, wherein the second access type comprises a different memory device type, a different interleave mode, and/or a different interleave granularity. In some embodiments, memory access resources in a given set support one access type, wherein one such memory access resources further supports another access type which is another memory access resource, of that same set, is not used to support. In an illustrative scenario according to one embodiment, MR 182, . . . , MR 183 each support a HBM access type (e.g., wherein each of MR 182, . . . , MR 183 is a HBM), but MR 182 and MR 183 are to be used to support different respective interleaving modes and/or different respective interleaving granularities.

In some embodiments, home agent 120 includes, is coupled to, or otherwise operates with circuitry—such as that of the illustrative decoder 122 shown—which provides system address decode (SAD) functionality to identify a memory access resource which correctly corresponds to a physical address (PA) in a memory access request. In one such embodiment, the PA is indicated to decoder 122 based on a cache miss of a LLC (or other) cache. For example, decoder 122 is configured to identify a given physical address as being in a corresponding address range, and based on the address range, to access a route table (RT) which specifies or otherwise indicates a path—such as one of the illustrative paths 172, . . . , 173, and 175, . . . , 176 shown—to access a corresponding memory access resource. In one such embodiment, the accessed RT includes an entry which corresponds to the address range, wherein the entry provides an indication of a path, a memory access resource, an interleave mode, an interleave granularity, and/or other suitable information to facilitate the accessing of a memory location associated with the PA. In various embodiments, at least some information describing an access type—e.g., information identifying an interleave mode and/or an interleave granularity—is provided in an item of an RT access list, where that item is used to determine an index for accessing other information in a corresponding route table (and entry thereof). In an embodiment, the accessing of route table(s) 160 by decoder 122 is based on the index offset information 126 of RT access list(s) 124.

Figure 2A:
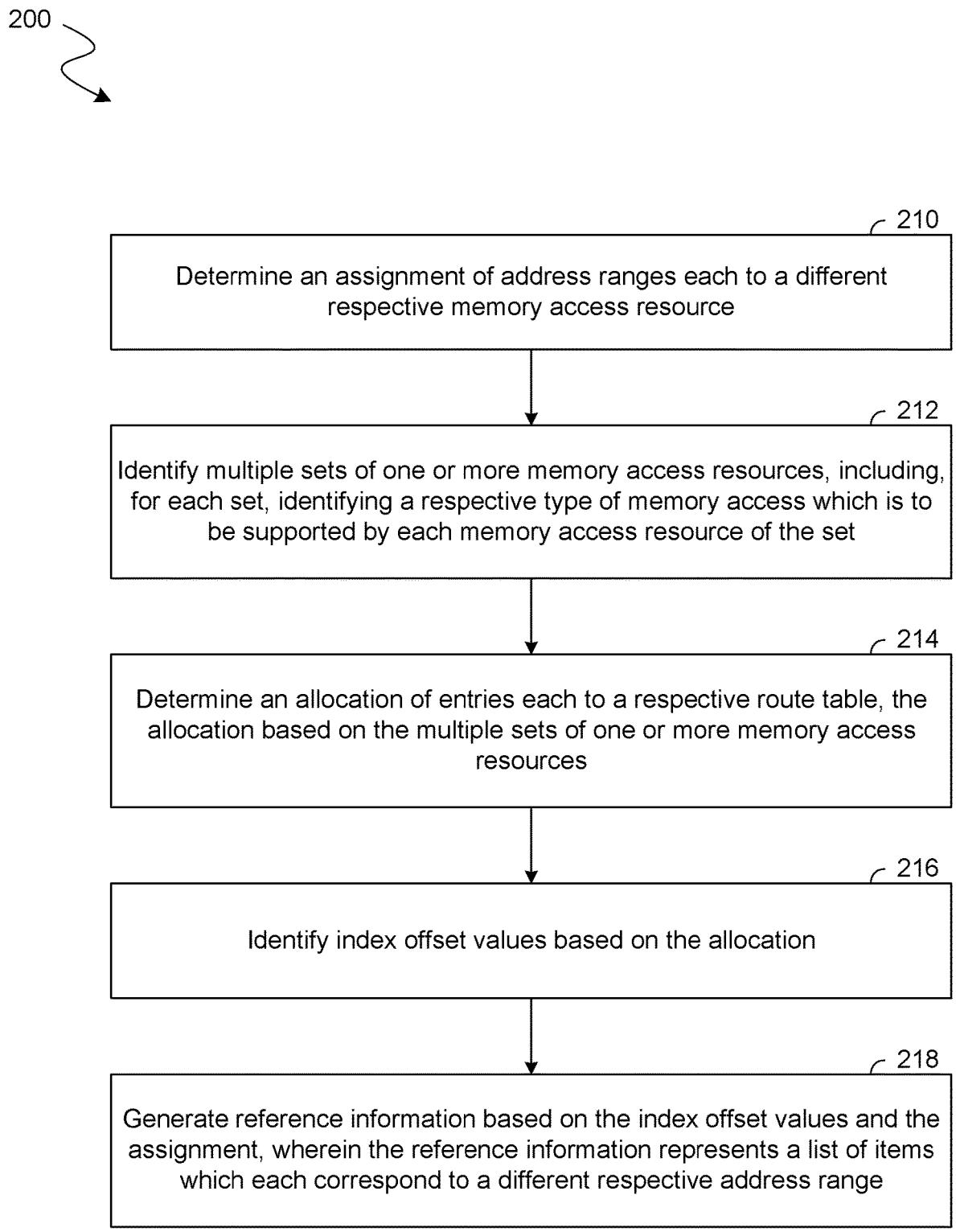
FIG. 2A shows a flow diagram illustrating features of a method to generate reference information for identifying a target of a memory access according to an embodiment.
Figure 3:
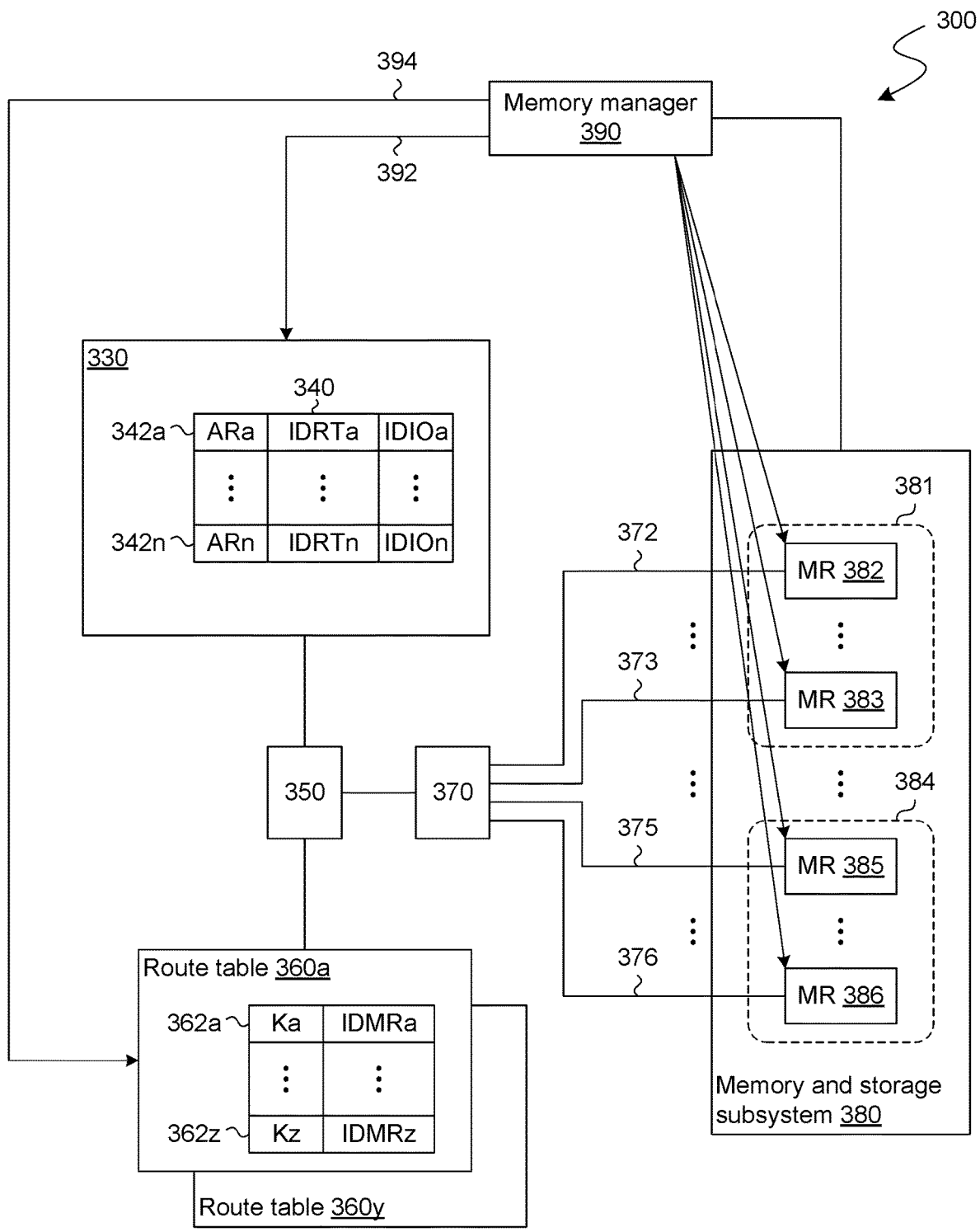
FIG. 3 shows a functional block diagram illustrating features of a system to facilitate an access to a memory access resource according to an embodiment.

FIG. 2A shows features of a method 200 which is to be performed at a processor to generate reference information for use in identifying a target of a memory access according to an embodiment. Method 200 illustrates one example of an embodiment wherein a route table (RT) access information is determined based on an allocation of entries each to a respective route table—e.g., wherein the items of an RT access list each identify a respective index offset to facilitate accessing one or more such entries. Operations such as those of method 200 are performed, for example, with some or all of system 100. To illustrate certain features of various embodiments, method 200 is described herein with reference to operations by an example system 300 which is shown in FIG. 3. However, in other embodiments, one or more operations of method 200 are performed with any of various other suitable devices which provide functionality described herein.

As shown in FIG. 2A, method 200 comprises (at 210) determining an assignment of address ranges each to a different respective memory access resource—e.g., each to a different respective one or more memory access resources. For example, referring now to FIG. 3, system 300 illustrates an embodiment which provides reference information for use in targeting a memory access resource. As shown in FIG. 3, a processor of system 300 comprises a decoder 350, a RT access list 340, a selector/controller 370 and route tables 360a, . . . , 360y which, for example, correspond functionally to decoder 122, RT access list(s) 124, memory controller(s) 131 and route table(s) 160. In one such embodiment, the processor is coupled to a memory and storage sub-system 380 which, for example, provides functionality of memory and storage subsystem 180.

The processor of system 300 further comprises logic—e.g., including any of various suitable hardware, firmware, and/or executing software—which is operable to generate information representing a RT access list. In some embodiments, such logic (which is represented as the illustrative memory manager 390 shown) is configured to discover or otherwise detect a presence of one or more memory access resources—e.g., including the illustrative memory access resources MR 382, . . . , MR 383 and memory access resources MR 385, . . . , MR 386 of memory and storage sub-system 380.

In one such embodiment, memory manager 390 provides functionality to generate, or otherwise identify an assignment of respective address ranges each to a different respective one (e.g., at least one) of MR 382, . . . , MR 383 and MR 385, . . . , MR 386. Such an assignment of address ranges includes operations which (for example) are adapted from conventional memory management techniques, which are not detailed herein to avoid obscuring certain features of various embodiments. Various embodiments are not limited with respect to a particular basis on which address ranges are variously assigned to memory access resources.

Method 200 further comprises (at 212) identifying multiple sets of one or more memory access resources, including, for each set of the multiple sets, identifying a respective type of memory access which is to be supported by each memory access resource of the set. In an embodiment, the identifying at 212 comprises determining that one or more memory access resources are each to support a memory device type (e.g., a HBM type, a CXL memory type, 2LM type, etc.), an interleave mode, and/or an interleave granularity.

For example, referring again to system 300, memory manager 390 further provides (or otherwise operates based on) functionality to generate or otherwise determine classifications of various memory access resources as each being configured to support a respective one or more types of memory access. In the example embodiment shown, memory manager 390 determines that each memory access resource in a set 381 of memory access resources (e.g., comprising MR 382, . . . , MR 383) is to support at least a first access type, and that each memory access resource in another set 384 of memory access resources (e.g., comprising MR 385, . . . , MR 386) is to support at least a second access type. In one such embodiment, the first access type is at least partially different than the second access type—e.g., wherein the first access type (or at least a constituent access sub-type thereof) is incompatible with some or all of the second access type. In some embodiments, an identifying of access resource sets includes operations which (for example) are adapted from conventional memory management techniques, which are not detailed herein to avoid obscuring certain features of said embodiments. Various embodiments are not limited with respect to a particular basis on which memory access resources are variously classified as supporting respective access types.

Referring again to FIG. 2, method 200 further comprises (at 214) determining an allocation of entries each to a respective route table, wherein the allocation is based on the multiple sets of one or more memory access resources. In one such embodiment, the determining at 214 includes (or is otherwise based on) determining, for each memory access resource set which is identified at 212, a total number of route table entries which are to be allocated for the set. Additionally or alternatively, the determining at 214 includes (or is otherwise based on) creating, for each of the memory access resources, a respective entry at a respective route table. In various embodiments, entry blocks (i.e., each block comprising a respective one or more entries which are contiguous with each other) are created each at a respective route table, wherein the entry blocks each correspond to a respective access type.

In one such embodiment, the allocating of a first entry block to a given route table is performed based on a size of the first entry block, but (for example) independent of a first access type which corresponds to that first entry block. For example, such allocating is performed independent of whether or how the first access type might be different than a second access type which corresponds to a second entry block which is also to be allocated to that same given route table (or, alternatively, to a different route table). By way of illustration and not limitation, an allocation of route table entries is selected (e.g., over an alternative allocation of said route table entries) to minimize or otherwise reduce an amount of unused space of the route tables and/or a total number of route tables to be used. In some embodiments, an allocating of entries each to a respective route table includes one or more operations which (for example) are adapted from conventional techniques, which are not detailed herein to avoid obscuring certain features of such embodiments.

Method 200 further comprises (at 216) identifying index offset values based on the allocation which is determined at 214. In one such embodiment, entry blocks (each allocated to a respective route table) each correspond to a respective index offset—e.g., wherein a given index offset indicates a difference between a first entry of the corresponding entry block, and some reference entry of the route table which is to include the entry block.

Method 200 further comprises (at 218) generating reference information based on the index offset values which are identified at 216, and further based on the assignment which is determined at 210. In various embodiments, the reference information (e.g., a RT access list) represents a list of items which each correspond to a different respective range of addresses. For example, the generating at 218 comprises, for each of the entry blocks of the allocation determined at 214, creating a different respective item of a route table access list. In one such embodiment, the list items each comprise an identifier of a respective route table, and an identifier of a respective index offset. Although some embodiments are not limited in this regard, each of the list items further comprise (for example) an identifier of a respective entry block which is indicated by the index offset identifier of that list item.

For example, referring again to system 300, route table 360*a* (for example) comprises entries 362*a*, . . . , 362*z* which each correspond to a different respective memory access resource. In an embodiment, memory manager 390 participates in communications (e.g., comprising signal 394) to create or otherwise determine the entries which are to be variously provided with route tables 360*a*, . . . , 360*y*. In an illustrative scenario according to one embodiment, entry 362*a* comprises information IDMRa which identifies one or more features—e.g., including a path, a memory device type, an interleaving mode, an interleaving granularity and/ or the like—of how a memory access is to be performed with a corresponding memory access resource. Similarly, entry 362*z* comprises information IDMRz which identifies one or more such features for another memory access resource which corresponds to entry 362*z*. For example, information IDMRa (or information IDMRz) specifies or otherwise indicates that a particular one of multiple paths 372, . . . , 373, 375, . . . , 376 is to be used to direct a memory access request to a corresponding memory access resource.

In the example embodiment shown, entries 362*a*, . . . , 362*z* are each accessible with a respective index—e.g., wherein entry 362*a* is to be searched or otherwise identified with an index Ka, and entry 362*z* is to be searched or otherwise identified with an index Kz. Some or all of indexes Ka, . . . , Kz for entries 362*a*, . . . , 362*z* are variously offset each from a reference index of route table 360*a*. Based on said index offsets, and based on the assignment of address ranges each to a respective memory access resource, memory manager 390 participates in communications (with signal 392, for example) to provide some or all of a RT access list 340 at a repository 330 of the processor.

By way of illustration and not limitation, RT access list 340 comprises items 342*a*, . . . , 342*n* which each correspond to a different respective range of addresses, and each comprise an identifier of a respective one of route tables 360*a*, . . . , 360*y*, as well as an identifier of a respective index offset. In the example embodiment shown, item 342*a* comprises an identifier ARa of a first address range, an identifier IDRTa of one of route tables 360*a*, . . . , 360*y*, and an identifier IDIOa of a first index offset for that one of route tables 360*a*, . . . , 360*y*. Alternatively or in addition, item 342*n* comprises an identifier ARn of a second address range, an identifier IDRTn of another of route tables 360*a*, . . . , 360*y*, and an identifier IDIOn of a second index offset for that other of route tables 360*a*, . . . , 360*y*. The index offset information of RT access list 340 facilitates an allocation of route table entries which, as compared to conventional techniques, is less dependent upon the type(s) of memory access to be indicated by said route table entries.

Figure 4A:
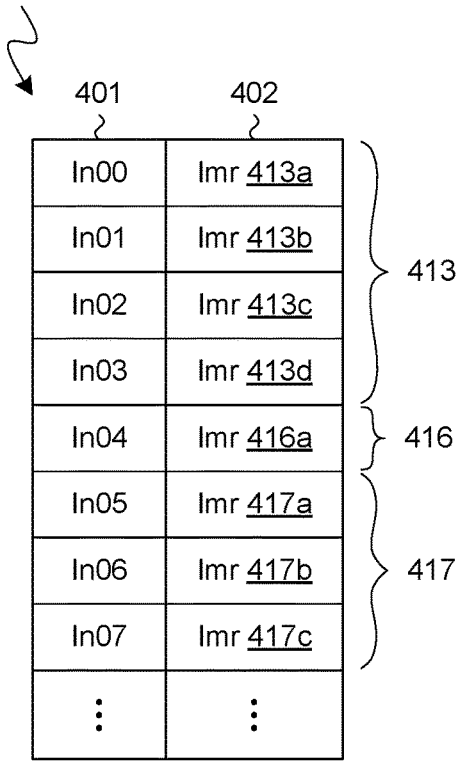
FIGS. 4A-4C show data diagrams each illustrating features of respective reference information to facilitate an access to a memory access resource according to a corresponding embodiment.
Figure 4B:
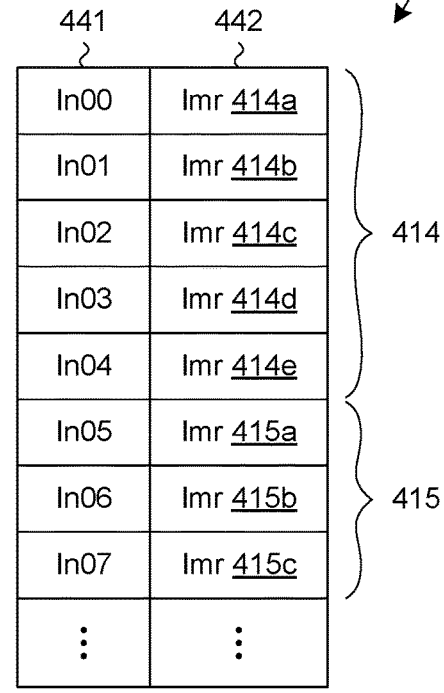
Figure 4C:
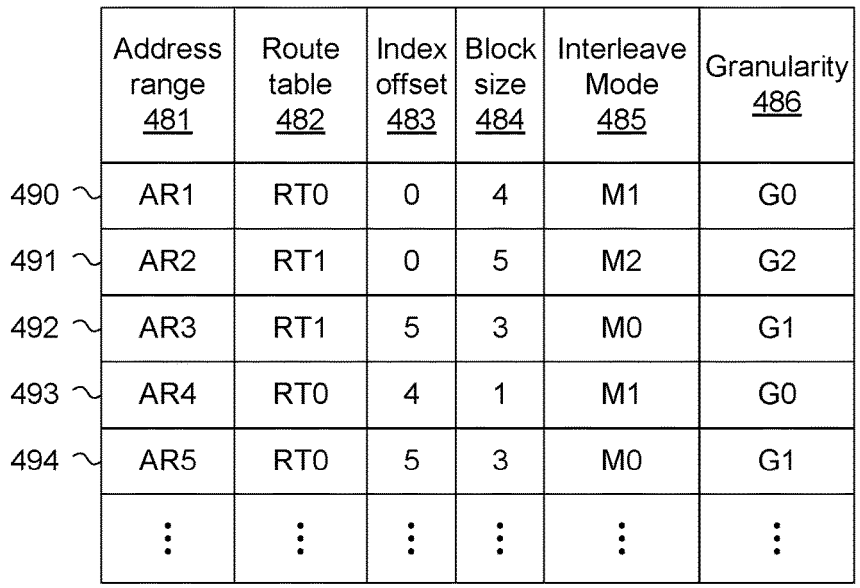

FIGS. 4A-4B show various examples of reference information which is to be used to facilitate a memory access according to an embodiment. More particularly, FIGS. 4A, 4B shows features of route tables 400, 440 (respectively) which are to variously provide entries each corresponding to a different respective address range. Moreover, FIG. 4C shows an example of a RT access list 480 which is to facilitate the accessing of one of route tables 400, 440. For example, route tables 400, 440 provide functionality such as that of route table(s) 160, or entries 362*a*, . . . , 362*z*—e.g., wherein RT access list 480 corresponds functionally to RT access list(s) 124 or RT access list 340. In one such embodiment, one or more operations of method 200 are performed based on route tables 400, 440 and RT access list 480.

By way of illustration and not limitation, an entry block 413 of route table 400 comprises four entries corresponding to different respective memory access resources which are each to support a first memory access type—e.g., wherein an entry block 416 of route table 400 comprises one entry corresponding to another memory access resource which is to support a second memory access type. Furthermore, an entry block 417 of route table 400 comprises three entries corresponding to different respective memory access resources which are each to support a third memory access type. Further still, an entry block 414 of route table 440 comprises five entries corresponding to different respective memory access resources which are each to support a fourth memory access type—e.g., wherein an entry block 415 of route table 440 comprises three entries corresponding to different respective memory access resources which are each to support a fifth memory access type.

In the example embodiment shown, the respective columns 402, 442 of route tables 400, 440 variously illustrate fields which are each to describe a respective memory access type (e.g., comprising a combination of multiple access type) to be used for a corresponding memory access resource. For example, entries of block 413 comprise respective fields Imr 413*a*-413*d* which each store respective information describing a corresponding memory access type. By way of illustration and not limitation, a given one of fields Imr 413*a*-413*d* specifies or otherwise indicates a communication path, a memory device type, and/or the like. Other descriptions of various memory access types are similarly provided (for example) with a field Imr 416*a* of the entry in block 416, respective fields Imr 417*a*-417*c* in the entries of block 417, respective fields Imr 414*a*-414*e* in the entries of block 414, and respective fields Imr 415*a*-415*c* in the entries of block 415.

The respective columns 401, 441 of route tables 400, 440 variously illustrate indices which are each to facilitate the accessing of a particular route table entry. For example, entries of route table 400 each include (or are otherwise addressable by) a respective one of first indices In00-In07—e.g., wherein entries of route table 440 are otherwise addressable by a respective one of second indices In00-In07. In one illustrative embodiment, an index In00 (for example) of route table 400 is to be a reference—e.g., indicating a first reference entry—for use in accessing route table 400, wherein the other indices In01-In07 of route table 400 indicate respective entries which are variously offset from the first reference entry. Similarly, another index In00 (for example) of route table 440 is to be a reference—e.g., indicating a second reference entry—for use in accessing route table 440, wherein the other indices In01-In07 of route table 440 indicate respective entries which are variously offset from the second reference entry.

To facilitate access to one of route tables 400, 440, RT access list 480 comprises items which each include, are indexed by, or are otherwise searchable based on, a respective address range. For example, column 481 of RT access list 480 represents address ranges which each correspond to (e.g., which are each identified in or are otherwise searchable based on) a different respective item of RT access list 480. Furthermore, column 482 of RT access list 480 represents identifiers of route tables which each correspond to a respective one of the identified address ranges. Further still, column 483 of RT access list 480 represents identifiers of index offsets which each correspond to a different respective one of the identified address ranges—e.g., wherein column 484 of RT access list 480 represents identifiers of the sizes of block entries which each correspond to a different respective one of the index offsets. Further still, column 485 of RT access list 480 represents identifiers of interleaving modes (such as the illustrative modes M0, M1, M2, . . . shown) which each correspond to a respective one of the identified address ranges—e.g., wherein column 486 of RT access list 480 represents identifiers of respective granularities (such as the illustrative granularities G0, G1, G2, . . . shown) to be variously applied in implementing said interleaving modes.

In the illustrative embodiment shown, an entry 490 of RT access list 480 indicates that entry block 413 of route table 400 (identified as route table RT0) is to be accessed for a memory access request which has a physical address within an address range AR1. Furthermore, an entry 491 of RT access list 480 indicates that entry block 414 of route table 440 (identified as route table RT1) is to be accessed for a memory access request which has a physical address within an address range AR2—e.g., wherein an entry 492 indicates that entry block 415 of route table 440 is to be accessed for a memory access request which has a physical address within an address range AR3. Further still, an entry 493 of RT access list 480 indicates that entry block 416 of route table 400 is to be accessed for a memory access request which has a physical address within an address range AR4—e.g., wherein an entry 494 indicates that entry block 417 of route table 400 is to be accessed for a memory access request which has a physical address within an address range AR5.

In the illustrative embodiment shown, entry 490 indicates an index offset of zero because entry block 413 begins at the reference index M00 for route table 400. Similarly, entry 491 indicates an index offset of zero because entry block 414 begins at the reference index M00 for route table 440. Furthermore, entry 492 includes an index offset identifier of five to indicate the difference between the indices In05, In00 of route table 440. Further still, entry 493 includes an index offset identifier of four to indicate the difference between the indices In04, In00 of route table 400—e.g., wherein entry 494 includes an index offset identifier of five to indicate the difference between the indices In05, In00 of route table 400. It is noted that the particular number, sizes, and contents of the block entries provided by route tables 400, 440 are merely illustrative, and not limiting on some embodiments. Similarly, the particular number, sizes, and contents of the items in RT access list 480 are merely illustrative, and not limiting on some embodiments.

Figure 2B:
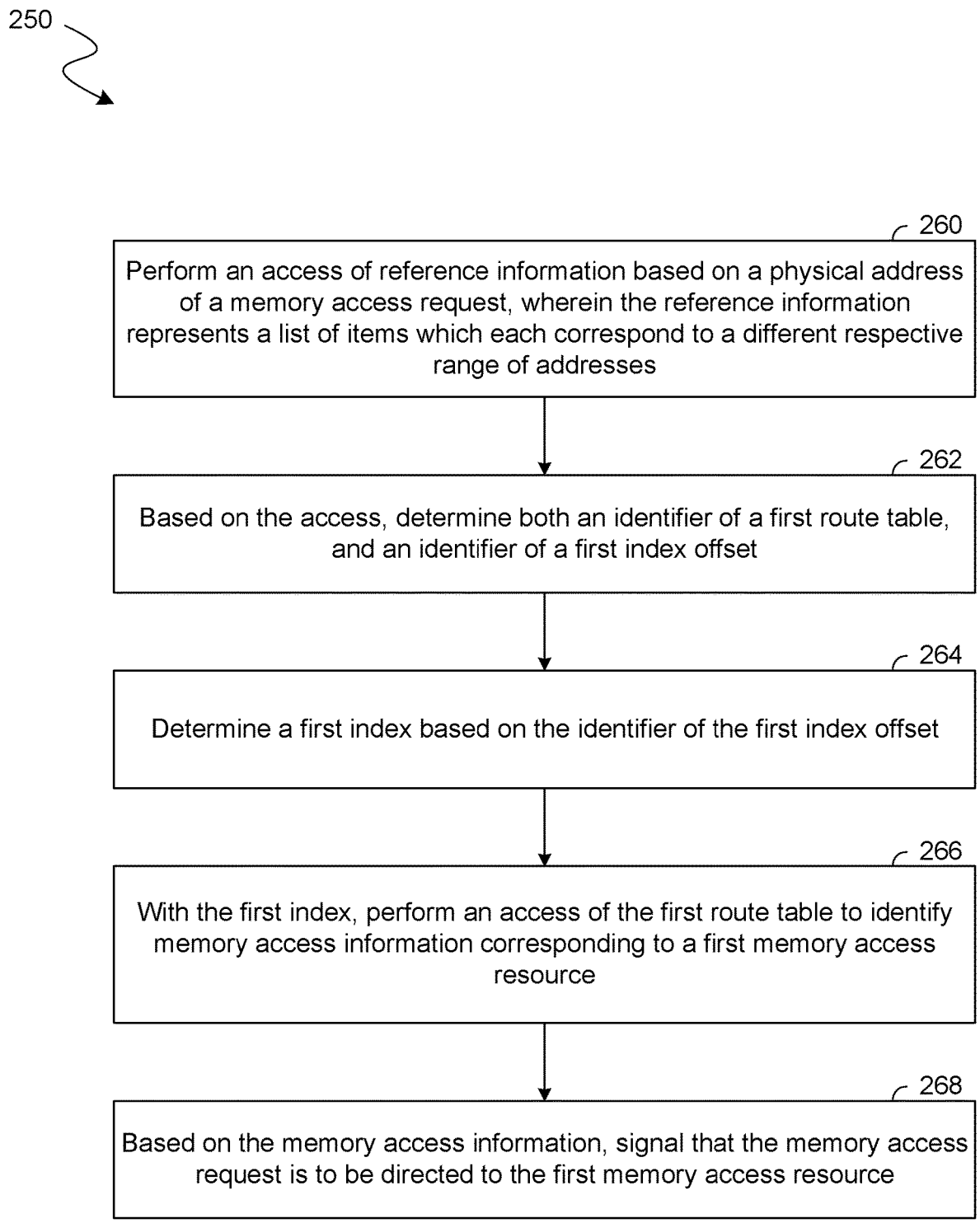
FIG. 2B shows a flow diagram illustrating features of a method to select one of multiple resources as a target of a memory access according to an embodiment.
Figure 5:
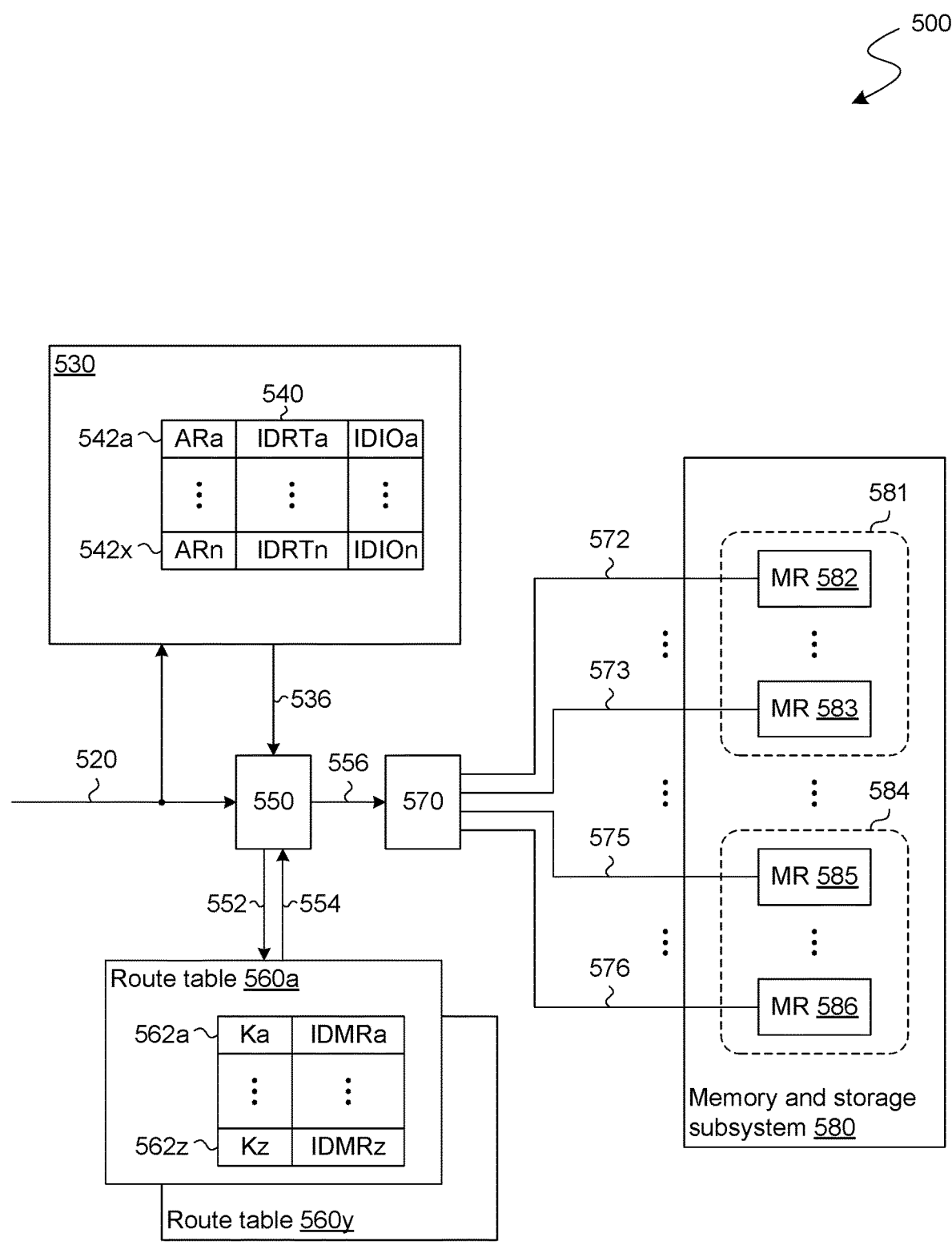
FIG. 5 shows a functional block diagram illustrating features of a system to determine a memory access resource to be targeted according to an embodiment.

FIG. 2B shows features of a method 250 to select one of multiple resources as a target of a memory access according to an embodiment. The method 250 illustrates one example of an embodiment wherein index offset information is used to access an entry of a route table based on an address—e.g., a physical address—of a memory access request. Operations such as those of method 250 are performed, for example, with circuitry of one of systems 100, 300—e.g., in combination with some or all of method 200. To illustrate certain features of various embodiments, method 250 is described herein with reference to operations by an example system 500 which is shown in FIG. 5. However, in other embodiments, one or more operations of method 250 are performed with any of various other suitable devices which provide functionality described herein.

As shown in FIG. 2B, method 250 comprises (at 260) performing an access of reference information based on a physical address of a memory access request. In some embodiments, the reference information—e.g., comprising a RT access list such as one generated at 218—represents a list of items which each correspond to a different respective range of addresses. In one such embodiment, the items of the list each comprise an identifier of a respective route table, and an identifier of a respective index offset. Although some embodiments are not limited in this regard, the list items each further comprise (for example) an identifier of a size of a respective block of one or more entries of the respective route table.

For example, referring now to FIG. 5, a processor of system 300 comprises a decoder 550, a repository 530, a selector/controller 570, and route tables 560a, . . . , 560y which, for example, correspond functionally to decoder 350, repository 330, selector/controller 370, and route tables 360a, . . . , 360y (respectively). In one such embodiment, the processor is coupled to a memory and storage sub-system 580 which, for example, provides functionality of memory and storage sub-system 380. Selector/controller 370 provided functionality to direct a memory access request to a particular memory access resource of memory and storage sub-system 580. For example, decoder 550 is coupled to indicate to selector/controller 570 a particular one of paths 572, . . . , 573 and paths 575, . . . , 576 to target one of the illustrative memory access resources MR 582, . . . , MR 583, and MR 585, . . . , MR 586 shown. In an embodiment, MR 582, . . . , MR 583 each belong to one access resource type 581—e.g., wherein MR 585, . . . , MR 586 each belong to a different access resource type 584.

In one such embodiment, performing the first access at 260 comprises decoder 550 receiving from repository 530 a signal 536 which includes information from a RT access list 540 provided at repository 530. By way of illustration and not limitation, a message 520 includes or otherwise indicates a memory access request that is to target a particular memory access resource. For example, message 520 comprises an address (e.g., a physical address) of a memory location for which a cache miss was detected. Based on the address, decoder 550 (or other suitable logic) performs a search of the entries 542a, . . . , 542x at RT access list 540, to identify an entry which corresponds to an address range that includes the address indicated by message 520.

Referring again to FIG. 2, method 250 further comprises (at 262) determining—based on the access which is performed at 260—both an identifier of a first route table, and an identifier of a first index offset. Based on the identifier of the first index offset, method 250 (at 264) further determines determining a first index. For example, referring again to system 500, the determining at 262 comprises decoder 550 receiving via signal 536 the respective identifiers of the first route table and the first index offset. Based on the identifiers, decoder 550 performs a calculation and/or other processing to generate an index with which a particular entry block of the indicated route table is to be accessed. In one such embodiment, determining the first index comprises calculating a value based on both the physical address and the index offset—e.g., wherein the value comprises a hash value. By way of illustration and not limitation, such a hash is based on values each representing a respective one of a physical address, an index offset, an interleaving mode, or an interleaving granularity. Calculating an index according to some embodiments comprises one or more operations which modify and/or are otherwise adapted from conventional techniques to identify an index for accessing an entry of a route table.

Referring again to FIG. 2, method 250 further comprises (at 266) performing an access of the first route table, with the first index determined at 264, to identify memory access information which corresponds to a first memory access resource. For example, referring again to system 500, decoder 550 sends a signal 552 to facilitate a search of the entries 562a, . . . , 562z of route table 560—e.g., wherein the search is based (for example) on a calculated index value Kz which corresponds to entry 562z. In one such embodiment, the search results in decoder 550 receiving a signal 554 comprising memory access information IDMRz from the entry 562z—e.g., wherein information IDMRz identifies or otherwise indicates a particular memory access resource (and, for example, indicates a particular access type which the memory access resource is to support).

Referring again to FIG. 2, method 250 further comprises (at 268) signaling that the memory access request is to be directed to the first memory access resource, wherein the signaling is based on the identified memory access information. For example, the signaling at 268 comprises decoder 550 sending to selector/controller 570 a signal 556 which indicates a particular one of the illustrative paths 572, . . . , 573 and 575, . . . , 576 shown.

In some embodiments, the first memory access resource supports a first type of memory access, wherein the first index offset indicates a location of a beginning of a first block of one or more entries of the first route table. For each entry of the first block of one or more entries, the entry indicates that a corresponding memory access resource is to support the first type of memory access. In one such embodiment, the first route table further comprises a second block of one or more entries, wherein, for each entry of the second block of one or more entries, the entry indicates that the first type of memory access is to be unsupported by a corresponding memory access resource.

In some embodiments, multiple route tables comprise the first route table, wherein method 250 further comprises one or more operations (not shown) which allocate blocks of entries each to a respective one of the multiple route tables. In one such embodiment, the blocks of entries correspond to different respective memory access types, wherein the allocating is both based on respective sizes of the blocks of entries, and independent of the different respective types of memory access.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel@ Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 7A:
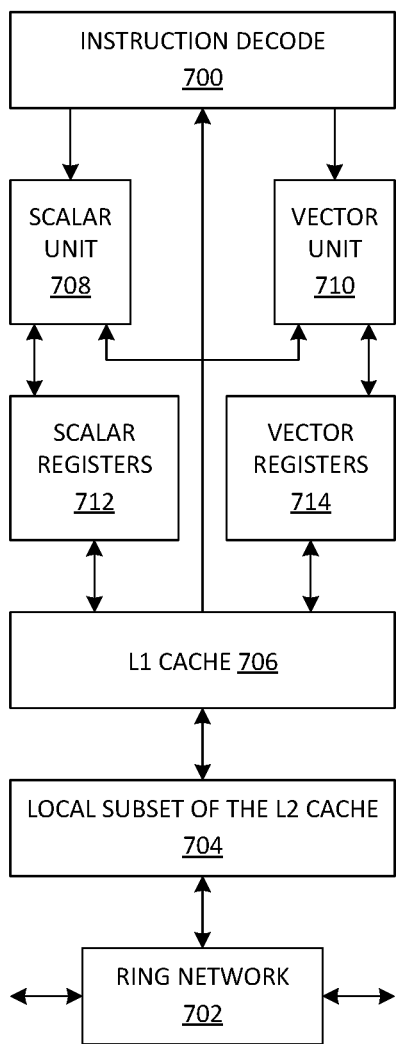
FIGS. 7A through 7B illustrate a block diagram of a more specific exemplary in-order core architecture, which core would be one of several logic blocks (including other cores of the same type and/or different types) in a chip.
Figure 7B:
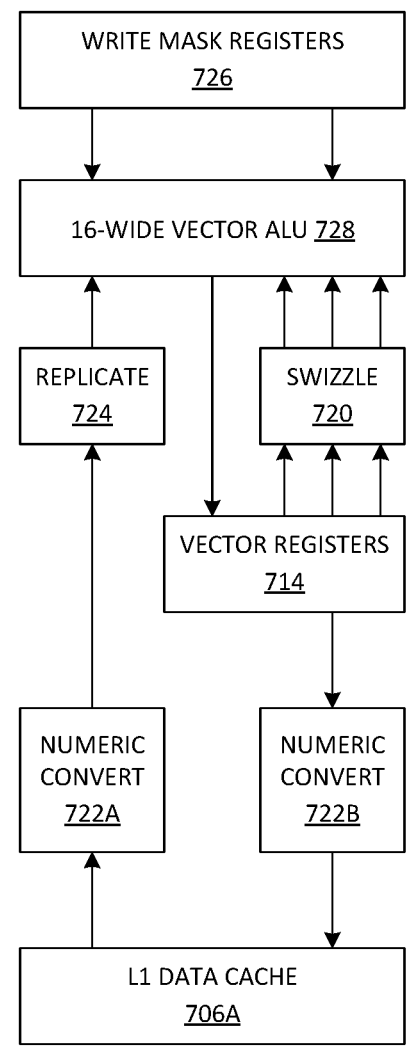

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 706A part of the L1 cache 706, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Figure 8:
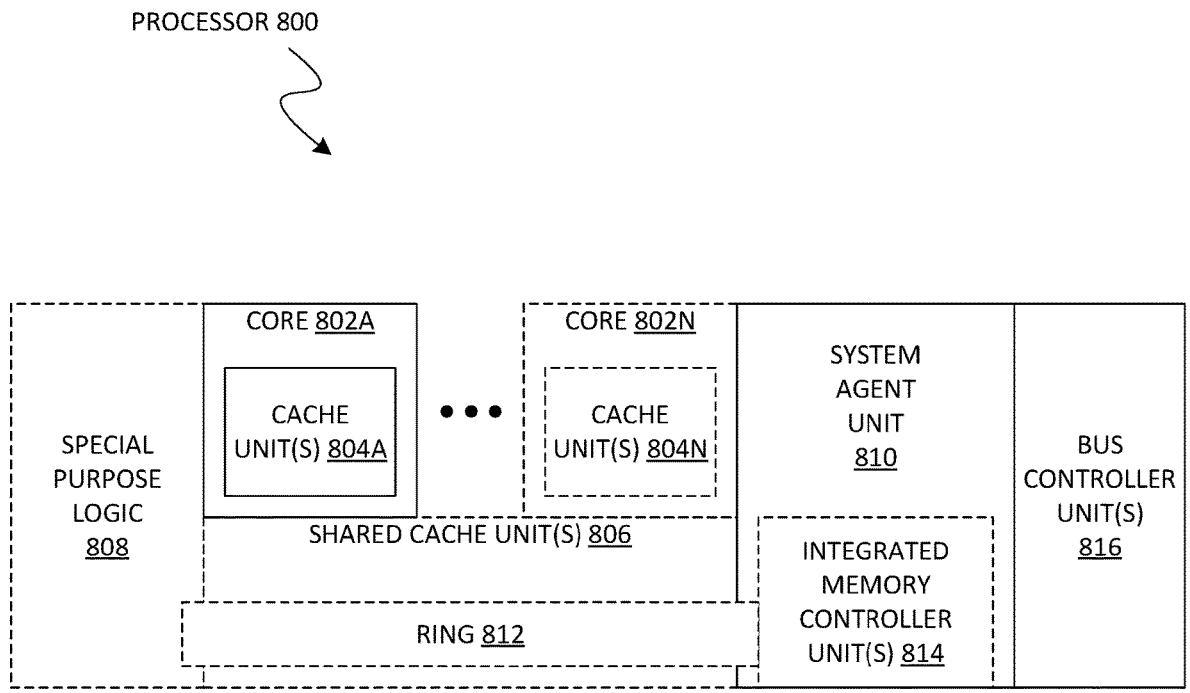
FIG. 8 is a block diagram of a processor that may have more than one core, may have an integrated memory controller, and may have integrated graphics according to an embodiment.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes respective one or more levels of caches 804A-N within cores 802A-N, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multithreading. The system agent 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9 through 12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
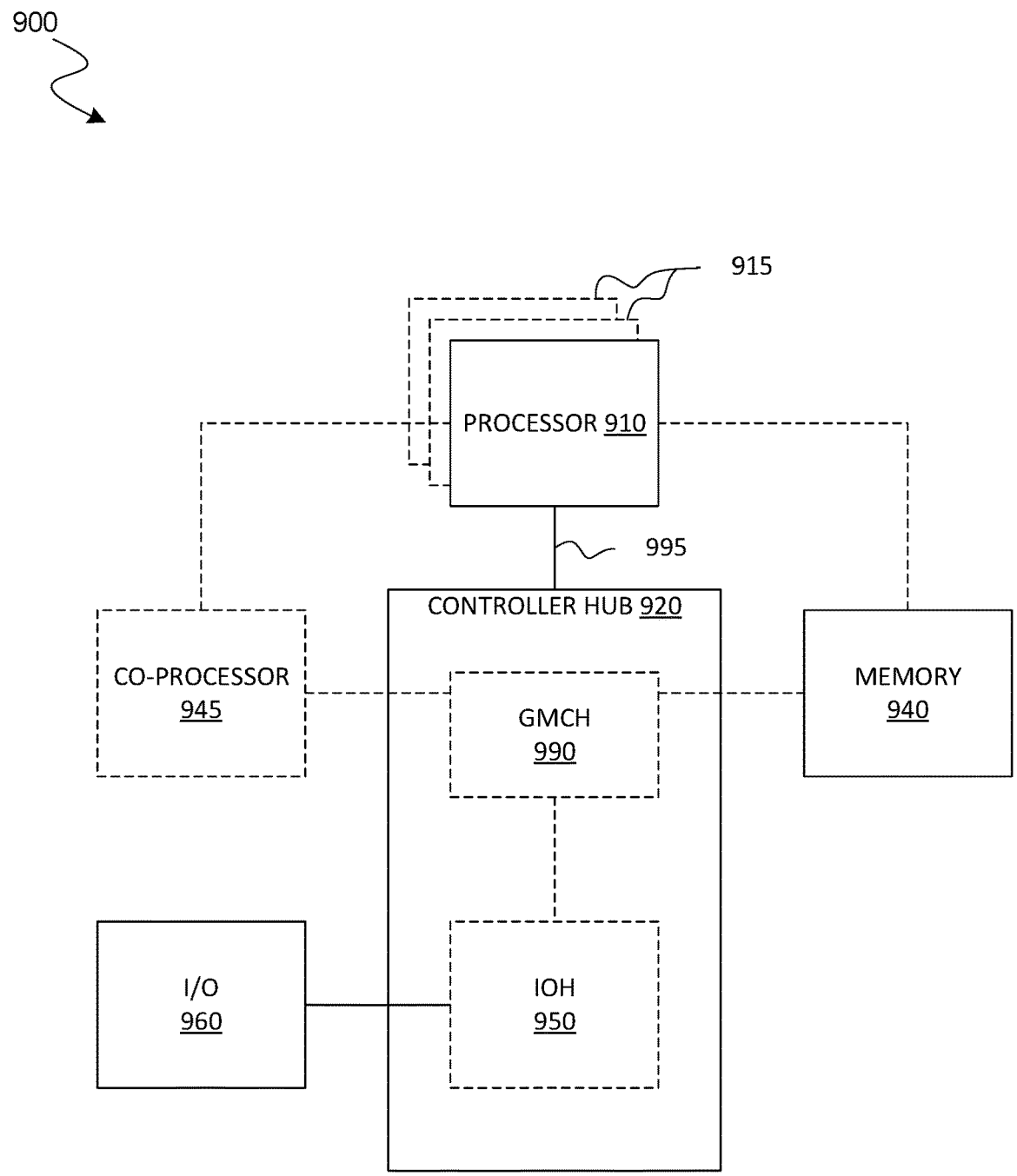
FIGS. 9 through 12 are block diagrams of exemplary computer architectures.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the processors 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
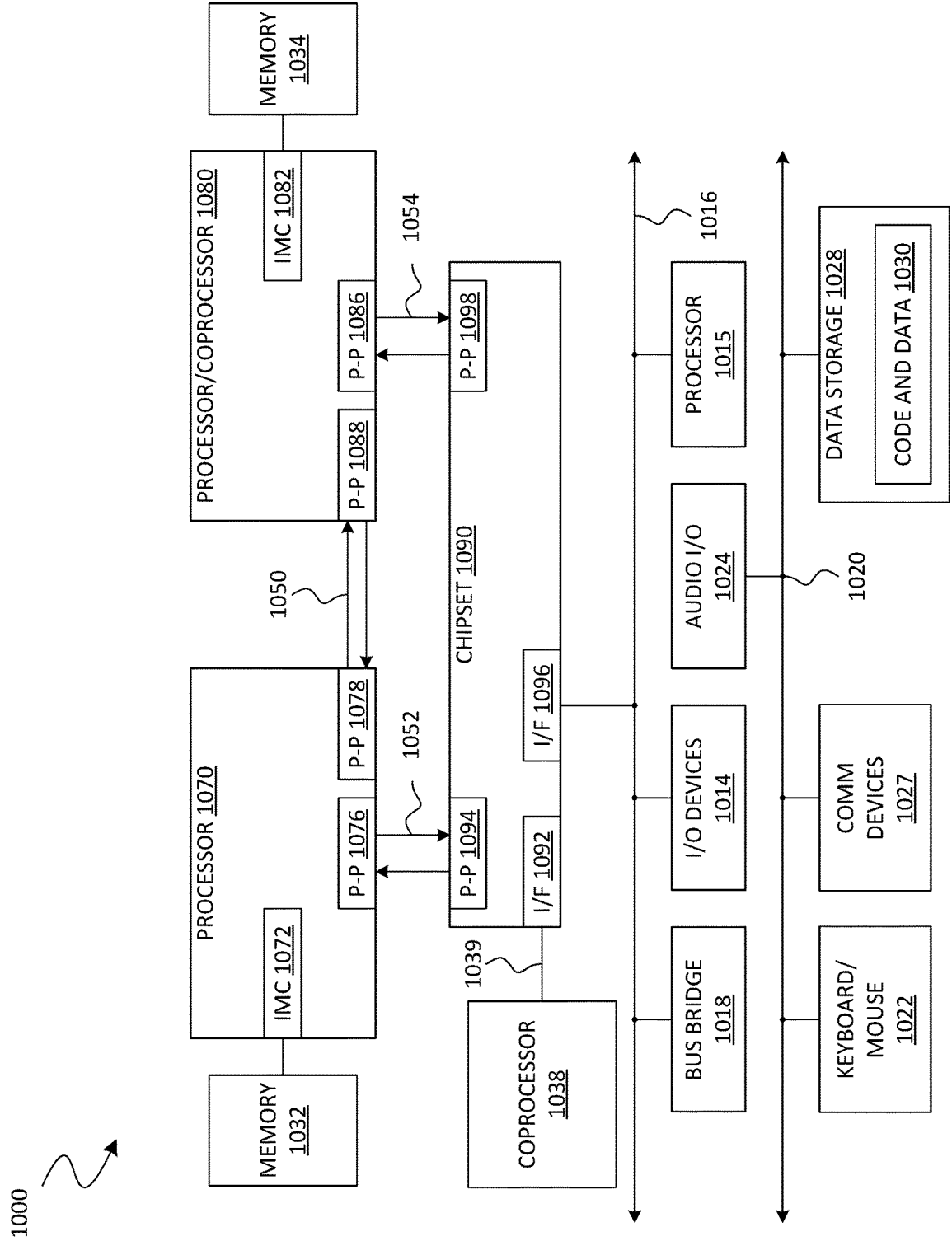

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller unit's point-to-point (P-P) interfaces 1076 and 1078; similarly, second processor 1080 includes P-P interfaces 1086 and 1088. Processors 1070, 1080 may exchange information via a point-to-point (P-P) interconnect 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1092 and an interconnect 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
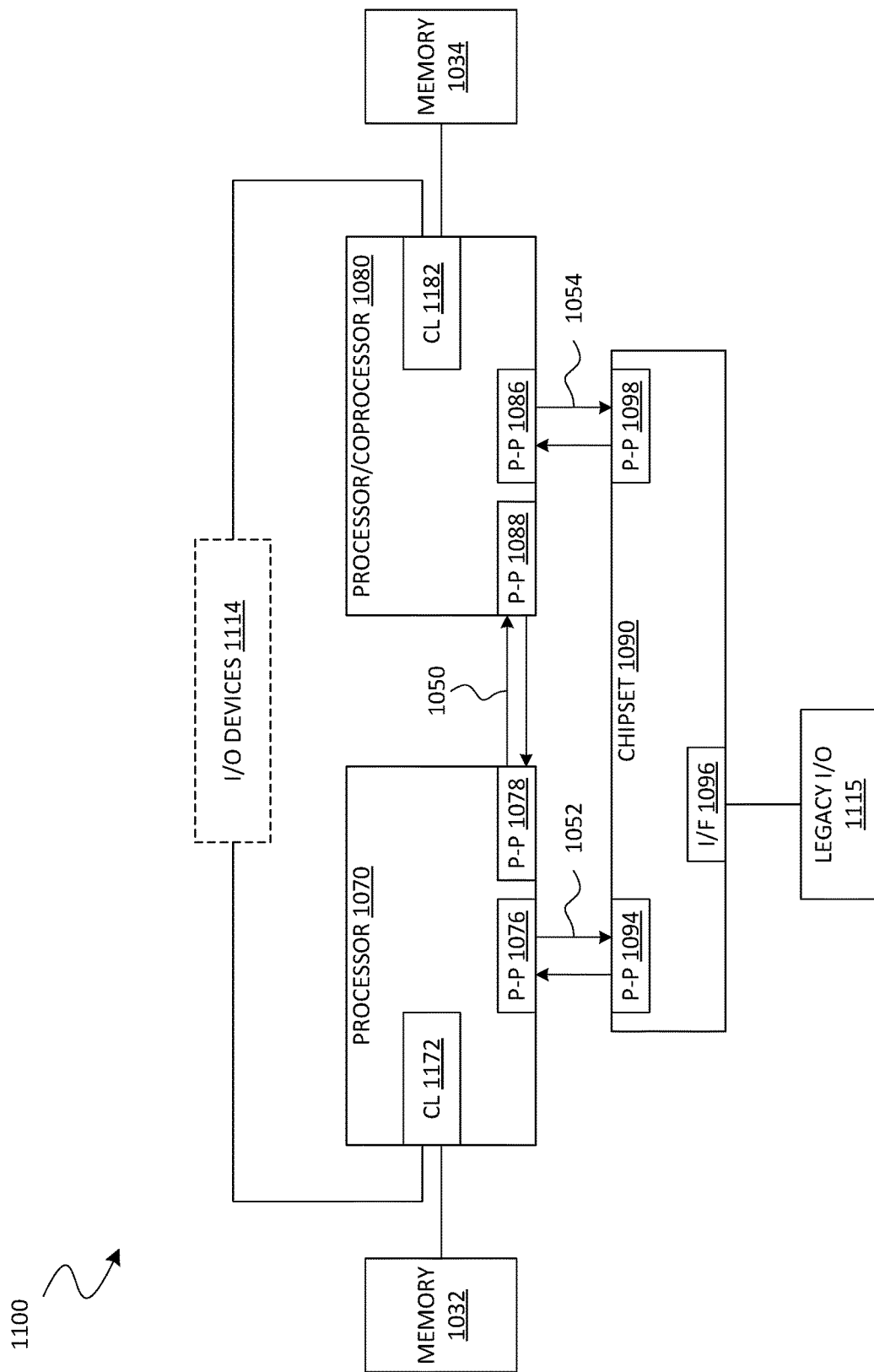

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1172 and 1182, respectively. Thus, the CL 1172, 1182 include integrated memory controller units and include I/O control logic. FIG. 11 illustrates that not only are the memories 1032, 1034 coupled to the CL 1172, 1182, but also that I/O devices 1114 are also coupled to the control logic 1172, 1182. Legacy I/O devices 1115 are coupled to the chipset 1090.

Figure 12:
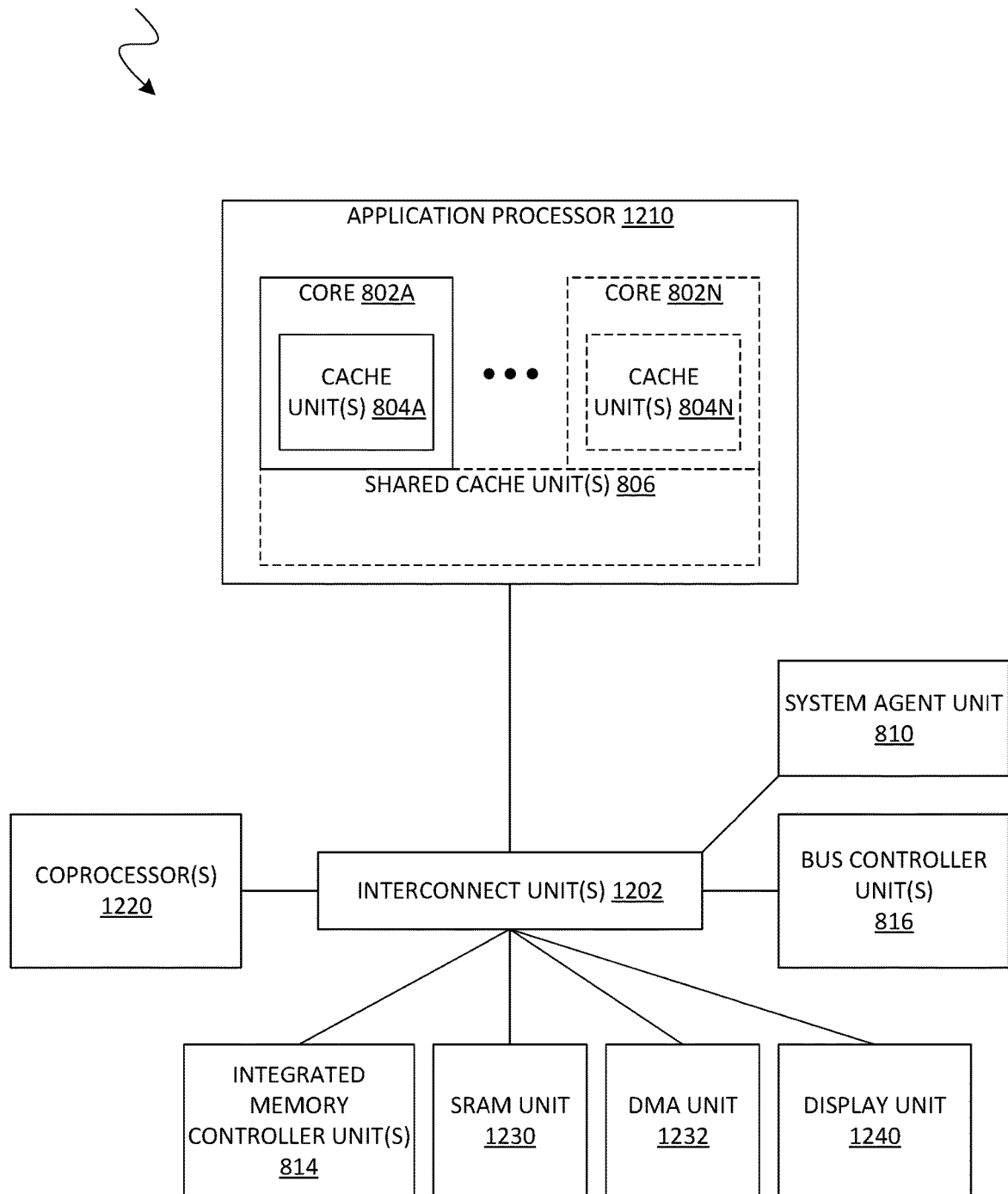

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 802A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
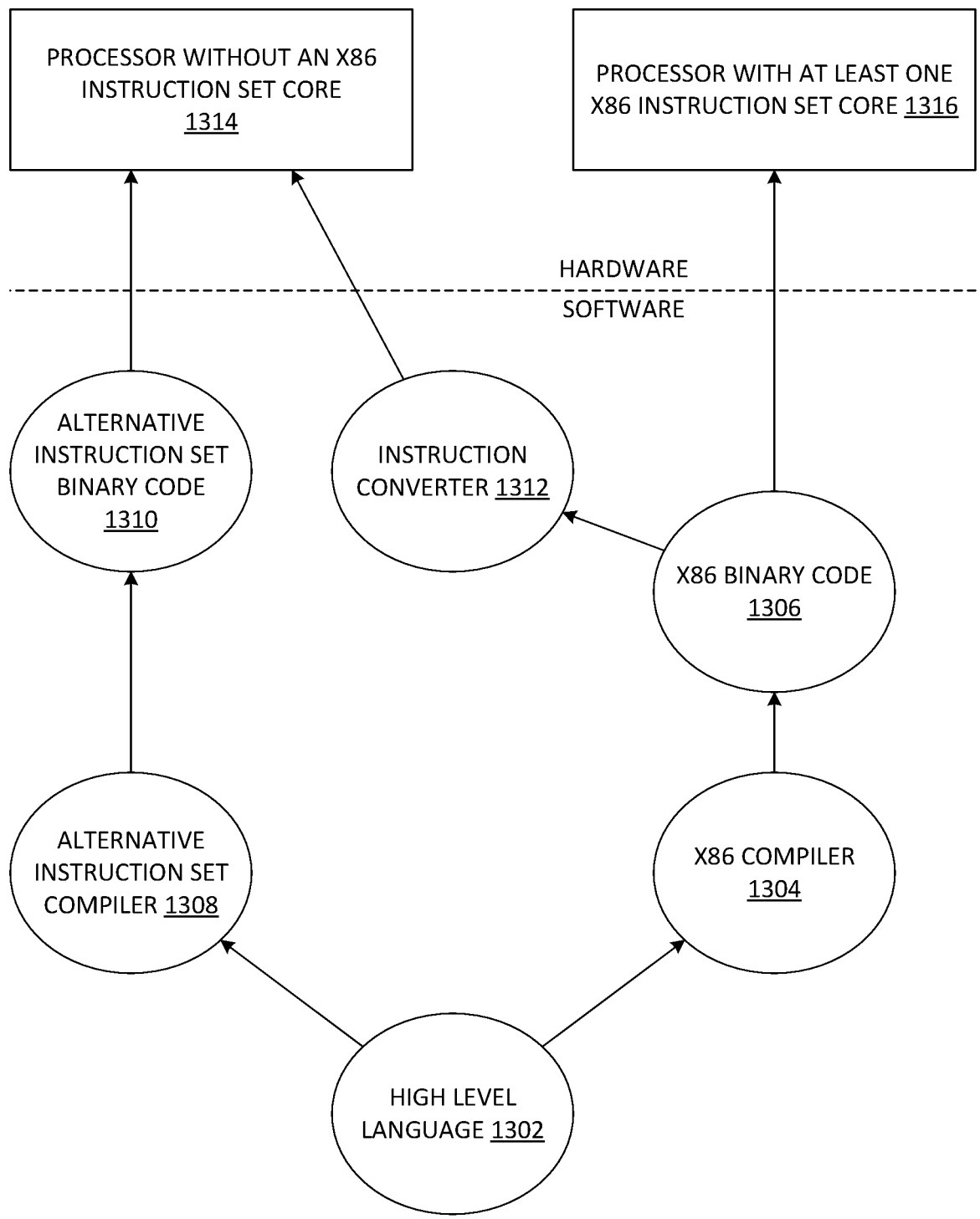
FIG. 13 is a block diagram contrasting the use of a software instruction converter to convert binary instructions in a source instruction set to binary instructions in a target instruction set according to an embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, CA and/or that execute the ARM instruction set of ARM Holdings of Sunnyvale, CA). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Techniques and architectures for facilitating access to memory access resources are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

In one or more first embodiments, a processor comprises route tables to provide entries corresponding to different respective memory access resources, a repository to store reference information which represents a list of items corresponding to different respective ranges of addresses, and wherein the items are each to comprise an identifier of a respective one of the route tables, and an identifier of a respective index offset, and first circuitry coupled to the route tables and to the repository, the first circuitry to perform a first access of the reference information based on a physical address of a memory access request, determine, based on the first access, an identifier of a first route table and an identifier of a first index offset, determine a first index based on the identifier of the first index offset, perform a second access of the first route table, with the first index, to identify memory access information corresponding to a first memory access resource, and generate a signal, based on the memory access information, to indicate that the memory access request is to be directed to the first memory access resource.

In one or more second embodiments, further to the first embodiment, the first circuitry to determine the first index comprises the first circuitry to calculate a value based on the physical address and the index offset.

In one or more third embodiments, further to the second embodiment, the value comprises a hash value.

In one or more fourth embodiments, further to the first embodiment or the second embodiment, the items are each to further comprise an identifier of a size of a respective block of one or more entries of the respective route table.

In one or more fifth embodiments, further to any of the first, second or fourth embodiments, the first memory access resource supports a first type of memory access, wherein the first index offset indicates a location of a beginning of a first block of one or more entries of the first route table, wherein, for each entry of the first block of one or more entries, the entry indicates that a respective memory access resource is to support the first type of memory access.

In one or more sixth embodiments, further to the fifth embodiment, the first route table further comprises a second block of one or more entries, wherein, for each entry of the second block of one or more entries, the entry indicates that the first type of memory access is to be unsupported by a respective memory access resource.

In one or more seventh embodiments, further to any of the first, second or fourth embodiments, the processor further comprises second circuitry to allocate blocks of entries each to a respective one of the route tables, wherein the blocks of entries correspond to different respective types of memory access, and wherein the second circuitry is to allocate the blocks of entries based on respective sizes of the blocks of entries, and independent of the different respective types of memory access.

In one or more eighth embodiments, further to any of the first, second or fourth embodiments, the processor of further comprises second circuitry to determine an assignment of address ranges each to a different respective memory access resource, identify multiple sets of one or more memory access resources, wherein, for each set of the multiple sets, the second circuitry is to identify a respective type of memory access which is to be supported by each memory access resource of the set, determine an allocation of entries each to a respective route table, the allocation based on the multiple sets of one or more memory access resources, identify index offset values based on the allocation, and generate the reference information based on the index offset values and the assignment.

In one or more ninth embodiments, further to any of the first, second or fourth embodiments, the first circuitry is to perform the first access based on a cache miss.

In one or more tenth embodiments, a system comprises a memory subsystem comprising memory access resources, a processor coupled to the memory subsystem, the processor comprising route tables to provide entries corresponding to different respective memory access resources, a repository to store reference information which represents a list of items corresponding to different respective ranges of addresses, and wherein the items are each to comprise an identifier of a respective one of the route tables, and an identifier of a respective index offset, and first circuitry coupled to the route tables and to the repository, the first circuitry to perform a first access of the reference information based on a physical address of a memory access request, determine, based on the first access, an identifier of a first route table and an identifier of a first index offset, determine a first index based on the identifier of the first index offset, perform a second access of the first route table, with the first index, to identify memory access information corresponding to a first memory access resource, and generate a signal, based on the memory access information, to indicate that the memory access request is to be directed to the first memory access resource.

In one or more eleventh embodiments, further to the tenth embodiment, the first circuitry to determine the first index comprises the first circuitry to calculate a value based on the physical address and the index offset.

In one or more twelfth embodiments, further to the eleventh embodiment, the value comprises a hash value.

In one or more thirteenth embodiments, further to the tenth embodiment or the eleventh embodiment, the items are each to further comprise an identifier of a size of a respective block of one or more entries of the respective route table.

In one or more fourteenth embodiments, further to any of the tenth, eleventh, or thirteenth embodiments, the first memory access resource supports a first type of memory access, wherein the first index offset indicates a location of a beginning of a first block of one or more entries of the first route table, wherein, for each entry of the first block of one or more entries, the entry indicates that a respective memory access resource is to support the first type of memory access.

In one or more fifteenth embodiments, further to the fourteenth embodiment, the first route table further comprises a second block of one or more entries, wherein, for each entry of the second block of one or more entries, the entry indicates that the first type of memory access is to be unsupported by a respective memory access resource.

In one or more sixteenth embodiments, further to any of the tenth, eleventh, or thirteenth embodiments, the processor further comprises second circuitry to allocate blocks of entries each to a respective one of the route tables, wherein the blocks of entries correspond to different respective types of memory access, and wherein the second circuitry is to allocate the blocks of entries based on respective sizes of the blocks of entries, and independent of the different respective types of memory access.

In one or more seventeenth embodiments, further to any of the tenth, eleventh, or thirteenth embodiments, the processor further comprises second circuitry to determine an assignment of address ranges each to a different respective memory access resource, identify multiple sets of one or more memory access resources, wherein, for each set of the multiple sets, the second circuitry is to identify a respective type of memory access which is to be supported by each memory access resource of the set, determine an allocation of entries each to a respective route table, the allocation based on the multiple sets of one or more memory access resources, identify index offset values based on the allocation, and generate the reference information based on the index offset values and the assignment.

In one or more eighteenth embodiments, further to any of the tenth, eleventh, or thirteenth embodiments, the first circuitry is to perform the first access based on a cache miss.

In one or more nineteenth embodiments, a method at a processor comprises performing a first access of reference information based on a physical address of a memory access request, wherein the reference information represents a list of items which each correspond to a different respective range of addresses, and wherein the items each comprise an identifier of a respective route table, and an identifier of a respective index offset, based on the first access, determining an identifier of a first route table and an identifier of a first index offset, determining a first index based on the identifier of the first index offset, with the first index, performing a second access of the first route table to identify memory access information corresponding to a first memory access resource, and based on the memory access information, signaling that the memory access request is to be directed to the first memory access resource.

In one or more twentieth embodiments, further to the nineteenth embodiment, determining the first index comprises calculating a value based on the physical address and the index offset.

In one or more twenty-first embodiments, further to the twentieth embodiment, the value comprises a hash value.

In one or more twenty-second embodiments, further to the nineteenth embodiment or the twentieth embodiment, the items each further comprise an identifier of a size of a respective block of one or more entries of the respective route table.

In one or more twenty-third embodiments, further to any of the nineteenth, twentieth, or twenty-second embodiments, the first memory access resource supports a first type of memory access, wherein the first index offset indicates a location of a beginning of a first block of one or more entries of the first route table, wherein, for each entry of the first block of one or more entries, the entry indicates that a respective memory access resource is to support the first type of memory access.

In one or more twenty-fourth embodiments, further to the twenty-third embodiment, the first route table further comprises a second block of one or more entries, wherein, for each entry of the second block of one or more entries, the entry indicates that the first type of memory access is to be unsupported by a respective memory access resource.

In one or more twenty-fifth embodiments, further to any of the nineteenth, twentieth, or twenty-second embodiments, the method further comprises allocating blocks of entries each to a respective one of the multiple route tables, wherein the blocks of entries correspond to different respective types of memory access, and wherein the allocating is both based on respective sizes of the blocks of entries, and independent of the different respective types of memory access.

In one or more twenty-sixth embodiments, further to any of the nineteenth, twentieth, or twenty-second embodiments, further comprises determining an assignment of address ranges each to a different respective memory access resource, identifying multiple sets of one or more memory access resources, comprising, for each set of the multiple sets, identifying a respective type of memory access which is to be supported by each memory access resource of the set, determining an allocation of entries each to a respective route table, the allocation based on the multiple sets of one or more memory access resources, identifying index offset values based on the allocation, and generating the reference information based on the index offset values and the assignment.

In one or more twenty-seventh embodiments, further to any of the nineteenth, twentieth, or twenty-second embodiments, the first access is performed based on a cache miss.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor comprising:
multiple route tables to provide entries corresponding to different respective memory access resources, wherein the multiple route tables comprise:
a first route table which is to correspond to a first table identifier; and
a second route table which is to correspond to a second table identifier;
a repository to store reference information which represents a list of items corresponding to different respective ranges of addresses, wherein the items are each to comprise an identifier of a respective one of the multiple route tables, and an identifier of a respective index offset, wherein the items are to comprise:
a first item comprising the first table identifier and an identifier of a first index offset; and
a second item comprising the second table identifier and an identifier of a second index offset; and
first circuitry coupled to the multiple route tables and to the repository, the first circuitry to:
perform a first access of the first item based on a physical address of a memory access request, wherein the first item corresponds to a first address range which comprises the physical address;
based on the first access:
determine a first index which is based on both the physical address and the identifier of the first index offset;
determine, based on the first table identifier, that the first route table comprises memory access information corresponding to a first memory access resource which is a target of the memory access request; and
perform a second access of the first route table, with the first index, to identify the memory access information; and
generate a signal, based on the second access, to indicate that the memory access request is to be directed to the first memory access resource.

2. The processor of claim 1, wherein the first circuitry to determine the first index comprises the first circuitry to calculate a value based on the physical address and the index offset.

3. The processor of claim 2, wherein the value comprises a hash value.

4. The processor of claim 1, wherein the items are each to further comprise an identifier of a size of a respective block of one or more entries of the respective route table.

5. The processor of claim 1, wherein the first memory access resource supports a first type of memory access, wherein the first index offset indicates a location of a beginning of a first block of one or more entries of the first route table, wherein, for each entry of the first block of one or more entries, the entry indicates that a respective memory access resource is to support the first type of memory access.

6. The processor of claim 5, wherein the first route table further comprises a second block of one or more entries, wherein, for each entry of the second block of one or more entries, the entry indicates that the first type of memory access is to be unsupported by a respective memory access resource.

7. The processor of claim 1, further comprising second circuitry to allocate blocks of entries each to a respective one of the multiple route tables, wherein the blocks of entries correspond to different respective types of memory access, and wherein the second circuitry is to allocate the blocks of entries based on respective sizes of the blocks of entries, and independent of the different respective types of memory access.

8. The processor of claim 1, further comprising second circuitry to:
determine an assignment of address ranges each to a different respective memory access resource;
identify multiple sets of one or more memory access resources, wherein, for each set of the multiple sets, the second circuitry is to identify a respective type of memory access which is to be supported by each memory access resource of the set;
determine an allocation of entries each to a respective route table, the allocation based on the multiple sets of one or more memory access resources;
identify index offset values based on the allocation; and
generate the reference information based on the index offset values and the assignment.

9. The processor of claim 1, wherein the first circuitry is to perform the first access based on a cache miss.

10. A system comprising:
a memory subsystem comprising memory access resources;
a processor coupled to the memory subsystem, the processor comprising:
multiple route tables to provide entries corresponding to different respective memory access resources, wherein the multiple route tables comprise:
a first route table which is to correspond to a first table identifier; and
a second route table which is to correspond to a second table identifier;
a repository to store reference information which represents a list of items corresponding to different respective ranges of addresses, wherein the items are each to comprise an identifier of a respective one of the multiple route tables, and an identifier of a respective index offset, wherein the items are to comprise:
a first item comprising the first table identifier and an identifier of a first index offset; and
a second item comprising the second table identifier and an identifier of a second index offset; and
first circuitry coupled to the multiple route tables and to the repository, the first circuitry to:
perform a first access of the first item based on a physical address of a memory access request, wherein the first item corresponds to a first address range which comprises the physical address;
based on the first access:
determine a first index which is based on both the physical address and the identifier of the first index offset;
determine, based on the first table identifier, that the first route table comprises memory access information corresponding to a first memory access resource which is a target of the memory access request; and perform a second access of the first route table, with the first index, to identify the memory access information; and generate a signal, based on the second access, to indicate that the memory access request is to be directed to the first memory access resource.

11. The system of claim 10, wherein the first circuitry to determine the first index comprises the first circuitry to calculate a value based on the physical address and the index offset.

12. The system of claim 10, wherein the items are each to further comprise an identifier of a size of a respective block of one or more entries of the respective route table.

13. The system of claim 10, wherein the first memory access resource supports a first type of memory access, wherein the first index offset indicates a location of a beginning of a first block of one or more entries of the first route table, wherein, for each entry of the first block of one or more entries, the entry indicates that a respective memory access resource is to support the first type of memory access.

14. The system of claim 10, the processor further comprising second circuitry to allocate blocks of entries each to a respective one of the route tables, wherein the blocks of entries correspond to different respective types of memory access, and wherein the second circuitry is to allocate the blocks of entries based on respective sizes of the blocks of entries, and independent of the different respective types of memory access.

15. The system of claim 10, the processor further comprising second circuitry to:

determine an assignment of address ranges each to a different respective memory access resource;

identify multiple sets of one or more memory access resources, wherein, for each set of the multiple sets, the second circuitry is to identify a respective type of memory access which is to be supported by each memory access resource of the set;

determine an allocation of entries each to a respective route table, the allocation based on the multiple sets of one or more memory access resources;

identify index offset values based on the allocation; and generate the reference information based on the index offset values and the assignment.

16. A method at a processor, the method comprising:

performing a first access of reference information based on a physical address of a memory access request, wherein multiple route tables provide entries corresponding to different respective memory access resources, wherein the multiple route tables comprise:

a first route table which is to correspond to a first table identifier; and a second route table which is to correspond to a second table identifier;

wherein the reference information represents a list of items which each correspond to a different respective range of addresses, wherein the items each comprise an identifier of a respective one of the multiple route tables, and an identifier of a respective index offset, wherein the items comprise:

a first item comprising the first table identifier and an identifier of a first index offset; and a second item comprising the second table identifier and an identifier of a second index offset;

based on the first access:

determining a first index which is based on both the physical address and the identifier of the first index offset;

determining, based on the first table identifier, that the first route table comprises memory access information corresponding to a first memory access resource which is a target of the memory access request; and with the first index, performing a second access of the first route table to identify the memory access information; and based on the second access, signaling that the memory access request is to be directed to the first memory access resource.

17. The method of claim 16, wherein determining the first index comprises calculating a value based on the physical address and the index offset.

18. The method of claim 16, wherein the items each further comprise an identifier of a size of a respective block of one or more entries of the respective route table.

19. The method of claim 16, wherein the first memory access resource supports a first type of memory access, wherein the first index offset indicates a location of a beginning of a first block of one or more entries of the first route table, wherein, for each entry of the first block of one or more entries, the entry indicates that a respective memory access resource is to support the first type of memory access.

20. The method of claim 16, further comprising:

determining an assignment of address ranges each to a different respective memory access resource;

identifying multiple sets of one or more memory access resources, including, for each set of the multiple sets, identifying a respective type of memory access which is to be supported by each memory access resource of the set;

determining an allocation of entries each to a respective route table, the allocation based on the multiple sets of one or more memory access resources;

identifying index offset values based on the allocation; and generating the reference information based on the index offset values and the assignment.

* * * * *